US012658826B2

(12) United States Patent
Kwon

(10) Patent No.: US 12,658,826 B2
(45) Date of Patent: Jun. 16, 2026

(54) DROPLET-BASED ENERGY HARVESTER AND ENERGY HARVESTING APPARATUS

(71) Applicant: KOREA ELECTRONICS TECHNOLOGY INSTITUTE, Seongnam-si (KR)

(72) Inventor: Soon Hyung Kwon, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 218 days.

(21) Appl. No.: 18/739,109

(22) Filed: Jun. 10, 2024

(65) Prior Publication Data

US 2024/0421726 A1 Dec. 19, 2024

(30) Foreign Application Priority Data

Jun. 13, 2023 (KR) ........................ 10-2023-0075488

(51) Int. Cl.
*H02N 1/08* (2006.01)
(52) U.S. Cl.
CPC ..................................... *H02N 1/08* (2013.01)
(58) Field of Classification Search
CPC ................................... H02N 1/04; H02N 1/08
See application file for complete search history.

(56) References Cited

U.S. PATENT DOCUMENTS

2015/0123513 A1* 5/2015 Kim ......................... H02N 1/08
310/300
2016/0218640 A1* 7/2016 Wang ....................... H02N 1/04

2019/0280620 A1* 9/2019 Ma ........................... H02N 1/08
2021/0126556 A1* 4/2021 Wang ....................... H02N 1/04
2022/0271686 A1* 8/2022 Guiney ................... H02N 1/04
2024/0388224 A1* 11/2024 Ali .......................... H02S 10/10

FOREIGN PATENT DOCUMENTS

EP 4 142 139 A1 3/2023
KR 10-2021-0004437 A 1/2021

OTHER PUBLICATIONS

Office Action received in Korean Application No. 10-2023-0075488 dated Nov. 13, 2024.

* cited by examiner

*Primary Examiner* — Oluseye Iwarere
*Assistant Examiner* — Masoud Vaziri
(74) *Attorney, Agent, or Firm* — Knobbe, Martens, Olson & Bear, LLP

(57) ABSTRACT

A droplet-based energy harvester is proposed. The droplet-based energy harvester may include a plate comprising a first surface and a second surface opposite to the first surface while being inclined such that a droplet flows on the first surface. The harvester may also include an upper electrode formed on the first surface, and a lower electrode formed on the second surface. The upper electrode may include a first upper electrode and a second upper electrode. The first upper electrode may be configured to emit electrons when the first upper electrode is connected to the second upper electrode by the droplet. The second upper electrode may be configured to absorb the electrons when the second upper electrode is connected to the first upper electrode by the droplet.

13 Claims, 9 Drawing Sheets

DROPLET-BASED ENERGY HARVESTER AND ENERGY HARVESTING APPARATUS

CROSS REFERENCE TO RELATED APPLICATION

This application claims the priority and benefits of Korean Patent Application No. 10-2023-0075488, filed Jun. 13, 2023, the entire contents of which are incorporated herein by reference for all purposes.

BACKGROUND

Technical Field

The present disclosure relates to a droplet-based energy harvester.

Discussion of Related Technology

Energy based on fossil fuels is evaluated as a main cause of global warming due to emission of carbon dioxide. Generation of ecofriendly energy through various methods is being developed for environmental conservation. For example, methods of wind power generation, geothermal power generation, solar power generation, etc. are being developed.

SUMMARY

One aspect is a droplet-based energy harvester configured to harvest both AC and DC.

Another aspect is a droplet-based energy harvester including a plate having a first surface and a second surface opposite to the first surface, the plate being inclined such that a droplet flows on the first surface, an upper electrode formed on the first surface, and a lower electrode formed on the second surface, wherein the upper electrode includes a first upper electrode configured to emit electrons when the first upper electrode is connected to a second upper electrode by the droplet, and the second upper electrode configured to absorb the electrons when the second upper electrode is connected to the first upper electrode by the droplet.

In accordance with an embodiment, the droplet-based energy harvester may further include a connection line configured to connect the lower electrode to one of the first upper electrode and the second upper electrode, a first lead-out line connected to the lower electrode and the first upper electrode or the second upper electrode interconnected by the connection line, thereby leading out current, and a second lead-out line connected to the second upper electrode or the first upper electrode not connected by the connection line, thereby leading out current.

In accordance with an embodiment, the first upper electrode and the second upper electrode may be sequentially arranged in a direction in which the droplet flows on the first surface.

In accordance with an embodiment, the droplet-based energy harvester may further include a sacrificial electrode disposed to be spaced apart from the first upper electrode and the second upper electrode.

In accordance with an embodiment, the sacrificial electrode may include a detachable portion detachably fixed to the plate, and a sacrificial metal formed at the detachable portion.

In accordance with an embodiment, the droplet-based energy harvester may further include a holder disposed between the first upper electrode and the second upper electrode and configured to hold the droplet in order to enable the droplet to interconnect the first upper electrode and the second upper electrode.

In accordance with an embodiment, the holder may be a porous member disposed between the first upper electrode and the second upper electrode to absorb the droplet or a hydrophilic path formed between the first upper electrode and the second upper electrode.

In accordance with an embodiment, the first upper electrode and the second upper electrode may be formed of different metals having different values of electronegativity, respectively.

In accordance with an embodiment, the sacrificial electrode may be formed of a metal having a lower electronegativity value than electronegativity values of the first upper electrode and the second upper electrode.

In accordance with an embodiment, the first upper electrode may be formed of aluminum, and the second upper electrode may be formed of copper.

In accordance with an embodiment, the sacrificial electrode may include zinc or magnesium.

In accordance with an embodiment, the plate may be formed of a dielectric material, and the lower electrode may be formed to be longer than the upper electrode in a flow direction of the droplet.

Another aspect is an energy harvesting apparatus including an energy harvesting module including the droplet-based energy harvester disposed in plural, a battery configured to store electrical energy output from the energy harvesting module, and a harvesting circuit configured to receive AC or DC output from the energy harvesting module and to store the received AC or DC in the battery.

In accordance with an embodiment, in the energy harvesting module, the energy harvester may be disposed in plural, lower electrodes of the plural energy harvesters may be formed to be spaced apart from one another, first upper electrodes of the plural energy harvesters may be interconnected in parallel, and second upper electrodes of the plural energy harvesters may be interconnected in parallel.

In accordance with an embodiment, in the energy harvesting module, the energy harvester may be disposed in plural, lower electrodes of the plural energy harvesters may be formed to be spaced apart from one another, a first upper electrode of one of adjacent ones of the plural energy harvesters and a second upper electrode of the other of the adjacent energy harvesters may be interconnected in series.

Prior to the description, it should be understood that the terms used in the specification and appended claims should not be construed as limited to general and dictionary meanings, but interpreted based on the meanings and concepts corresponding to technical aspects of the present disclosure on the basis of the principle that the inventor is allowed to define terms appropriately for best explanation.

BRIEF DESCRIPTION OF THE DRAWINGS

The above and other objects, features and other advantages of the present disclosure will be more clearly understood from the following detailed description taken in conjunction with the accompanying drawings.

DETAILED DESCRIPTION

Figure 1:
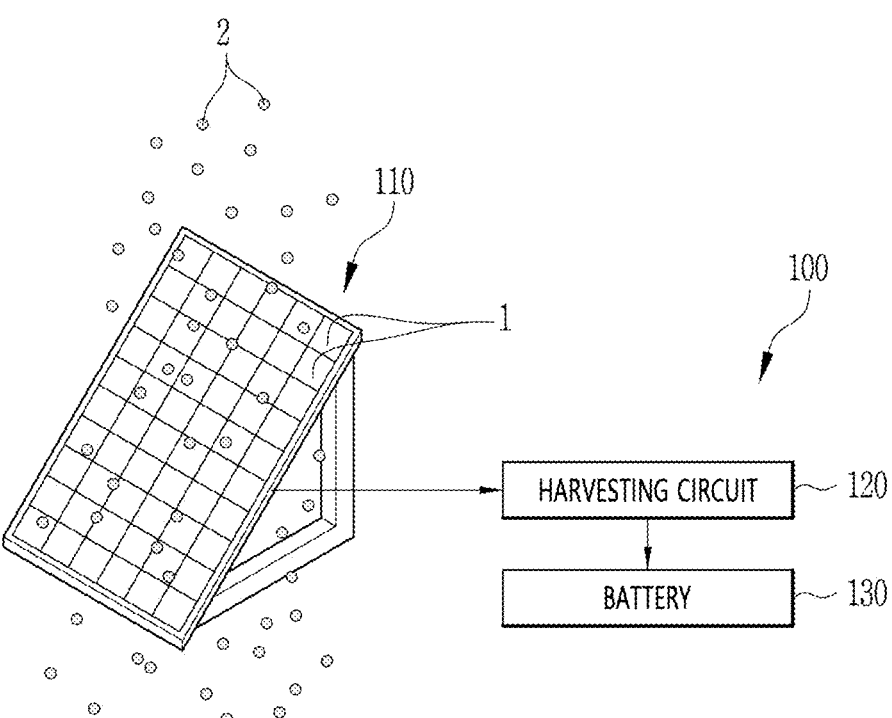
FIG. 1 is a view showing an energy harvesting apparatus according to an embodiment of the present disclosure.

Energy harvesting intended to generate energy through collection of energy consumed in daily life, for example, motions of a person, movement of a vehicle, etc., is being developed. In the energy harvesting field, various methods are being developed. For example, a method of collecting electrical energy from a walking action through application of piezoelectric elements to shoes or the like is being developed.

Objects, particular advantages and new features of the present disclosure will be more clearly understood from the following detailed description and preferred embodiments taken in conjunction with the accompanying drawings. However, the present disclosure is not limited to the embodiments. In the following description, when a detailed description of the relevant known function or configuration is determined to unnecessarily obscure the subject matter of the present disclosure, such detailed description will be omitted.

In the specification, in adding reference numerals for elements in each drawing, it should be noted that like reference numerals already used to denote like elements in one drawing are also used to denote the elements in another drawing wherever possible.

It should be noted that terms used herein are merely used to describe a specific embodiment, not to limit the present disclosure. Incidentally, unless clearly used otherwise, singular expressions include a plural meaning.

The drawings are not necessarily to scale and, in some instances, proportions may be exaggerated or schematically illustrated in order to clearly illustrate features of the embodiments.

It should be further understood that the terms "comprises", "comprising,", "has", "having", "includes" and/or "including", when used herein, specify the presence of stated features (for example, integers, functions, operations, or constituent elements such as components), but do not preclude the presence of other features.

In addition, the terms "one", "the other", "another", "first", "second", etc. are used to differentiate one constituent element from another constituent element, and these constituent elements should not be limited by these terms.

Meanwhile, it should be understood that, when terms representing directions such as upwards, downwards, left, right, X-axis, Y-axis, Z-axis, etc. are used in the specification, these terms are merely for convenience of description, and such directions may be expressed differently from those represented by the terms, in accordance with the viewing position of an observer or the position at which an object is disposed.

It should be understood that there is no intent to limit the embodiments described in the present disclosure and the accompanying drawings to particular forms, but on the contrary, embodiments are to cover all modifications, equivalents, and alternatives falling within the spirit and scope of embodiments.

Hereinafter, exemplary embodiments of the present disclosure will be described in detail with reference to the accompanying drawings.

FIG. 1 is a view showing an energy harvesting apparatus 100 according to an embodiment of the present disclosure.

The energy harvesting apparatus 100 according to the embodiment may include an energy harvesting module 110 in which a plurality of droplet-based energy harvesters 1 is disposed, a battery 130 configured to store electrical energy output from the energy harvesting module 110, and a harvesting circuit 120 configured to receive AC or DC current output from the energy harvesting module 110 and to store the received AC or DC current in the battery 130.

The energy harvesting apparatus 100 may harvest electrical energy generated by droplets 2 falling onto the energy harvesting module 110, and may store the harvested electrical energy in the battery 130. The droplets 2 are falling water droplets. The energy harvesting apparatus 100 may be installed in an environment in which there are freely-falling droplets. For example, the energy harvesting apparatus 100 may be installed in a rainy area, a space in which water droplets concentrated on a ceiling fall, a space of a power plant or the like in which steam is concentrated into water droplets which, in turn, fall, etc. The energy harvesting apparatus 100 may be installed on a solar panel and, as such, may perform droplet-based power generation on a rainy day.

The energy harvesting module 110 may include a plurality of droplet-based energy harvesters 1. The energy harvesting module 110 may include a plurality of droplet-based energy harvesters 1 arranged on one plate 10 in an array. The energy harvesting module 110 may be manufactured to have a large area using an electrode printing process.

The battery 130 may include a rechargeable secondary cell, a capacitor, etc. The battery 130 may store electrical energy output from the energy harvesting module 110, and may supply electric power to an electric grid or may supply electric power to a load.

The harvesting circuit 120 may temporarily store AC or DC output from the energy harvesting module 110 in the capacitor, and may then store, in the battery 130, the resultant electric power stored in the capacitor. The harvesting circuit 120 may rectify AC output from the energy harvesting module 110, and may then charge the battery 130 using the rectified current. The harvesting circuit 120 may charge DC output from the energy harvesting module 110 in the battery 130.

Figure 2:
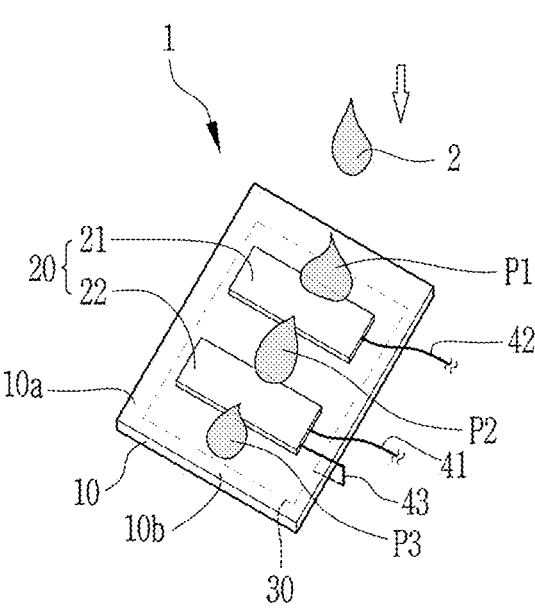
FIG. 2 is a view showing one of a plurality of droplet-based energy harvesters included in an energy harvesting module of FIG. 1.
Figure 3:
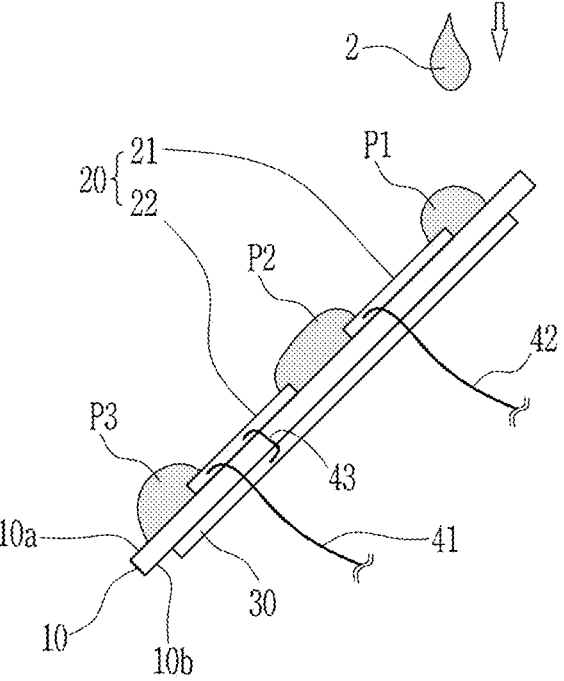
FIG. 3 is a view showing movement of a droplet on the droplet-based energy harvester viewed at one side surface.

FIG. 2 is a view showing one of the plurality of droplet-based energy harvesters 1 included in the energy harvesting module 110 of FIG. 1. FIG. 3 is a view showing movement of a droplet 2 on the droplet-based energy harvester 1 viewed at one side surface.

The droplet-based energy harvester 1 according to the embodiment may include the plate 10, which has a first surface 10a and a surface opposite to the first surface 10a, that is, a second surface 10b, while being inclined such that the droplet 2 flows on the first surface 10a, an upper electrode 20 formed on the first surface 10a, and a lower electrode 30 formed on the second surface 10b.

The droplet-based energy harvester 1, which includes the electrodes formed on the plate 10, may generate electrical energy in a procedure in which the droplet 2 passes through the electrodes while flowing along the first surface 10a of the plate 10.

The plate 10 may be formed of an electrically insulating material. The plate 10 may be formed of polypropylene (PP), polyethylene (PE), or other synthetic resins. The plate 10 may be installed in a state of being inclined with respect to a gravity direction in order to allow the droplet 2 falling onto the first surface 10a to flow in the gravity direction. The droplet 2 may move in one direction by force other than the gravity. In this case, the plate 10 may be installed in a state of being inclined with respect to the movement direction of the droplet 2 such that the moving droplet 2 flows while contacting the first surface 10a.

The upper electrode 20 may be formed on the first surface 10a of the plate 10. The upper electrode 20 may be formed of a metal having electrical conductivity. The upper electrode 20 may be formed to be exposed such that the upper electrode 20 directly contacts the droplet 2. That is, on the plate 10, there is no protective layer configured to cover the upper electrode 20 in order to isolate the upper electrode 20 from the droplet 2. When a plurality of upper electrodes 20 is provided on the first surface 10a, the droplet 2 may flow along the first surface 10a while sequentially passing through a position P1, at which the droplet 2 initially contacts one of the upper electrodes 20, a position P2, at which the droplet 2 interconnects adjacent ones of the upper electrodes 20, and a position P3, at which the droplet 2 escapes from the upper electrodes 20.

The upper electrode 20 may include a first upper electrode 21 configured to emit electrons when the first upper electrode 21 is connected to a second upper electrode 22 by the droplet 2, and the second upper electrode 22 which absorbs electrons when the second upper electrode 22 is connected to the first upper electrode 21 by the droplet 2. When metals respectively forming the first upper electrode 21 and the second upper electrode 22 are interchanged, the electrode configured to absorb electrons and the electrode configured to emit electrons may be interchanged. When the first upper electrode 21 and the second upper electrode 22 are interconnected by the droplet 2, one thereof may become a cathode, and the other thereof may become an anode. When the droplet 2 flowing along the first surface 10a of the plate 10 is disposed between the first upper electrode 21 and the second upper electrode 22 (P2), charges move between the first upper electrode 21 and the second upper electrode 22 through the droplet 2 and, as such, current may be generated. The first upper electrode 21 and the second upper electrode 22 may be formed of different metals having different values of electronegativity, respectively. The upper electrodes may include copper (Cu), aluminum (Al), zinc (Zn), other metals, alloys thereof, etc. For example, the first upper electrode 21 may be formed of aluminum (Al), and the second upper electrode 22 may be formed of copper (Cu).

The first upper electrode 21 and the second upper electrode 22 may be sequentially arranged in a direction in which the droplet 2 flows on the first surface 10a. The second upper electrode 22 may be disposed downstream of the first upper electrode 21 in the direction in which the droplet 2 flows on the first surface 10a. Conversely, the first upper electrode 21 may be disposed downstream of the second upper electrode 22 in the direction in which the droplet 2 flows on the first surface 10a. The first upper electrode 21 and the second upper electrode 22 may be disposed to be spaced apart from each other in a direction perpendicular to the flow direction of the droplet 2. Alternatively, the first upper electrode 21 and the second upper electrode 22 may be disposed to be inclined with respect to the flow direction of the droplet 2.

The first upper electrode 21 and the second upper electrode 22 may be formed to be spaced apart from each other. The first upper electrode 21 and the second upper electrode 22 may be spaced apart from each other by a distance enabling the first upper electrode 21 and the second upper electrode 22 to be temporarily interconnected by the droplet 2 when the droplet 2 moves therebetween. The first upper electrode 21 and the second upper electrode 22 may take the form of a line having a small width and a great length. The first upper electrode 21 and the second upper electrode 22 may be disposed such that widths thereof are parallel to the flow direction of the droplet 2.

The lower electrode 30 may be formed on the second surface 10b of the plate 10. The plate 10 may be formed of a dielectric material, and may be formed to be longer than the upper electrode 20 in the movement direction of the droplet 2. The lower electrode 30 may be formed of an electrically conductive metal. The lower electrode 30 may be formed to have a greater area than that of the upper electrode 20 formed on the first surface 10a of the plate 10. Both the first upper electrode 21 and the second upper electrode 22 may be disposed in a region where the lower electrode 30 is formed. The lower electrode 30 may be connected to the first upper electrode 21 or the second upper electrode 22 by a connection line 43. The lower electrode 30 may be formed of the same material as that of the first upper electrode 21 or the second upper electrode 22 connected thereto by the connection line 43. For example, when the lower electrode 30 is connected to the first upper electrode 21, the first upper electrode 21 and the lower electrode 30 may be formed of the same metal. On the other hand, when the lower electrode 30 is connected to the second upper electrode 22, the second upper electrode 22 and the lower electrode 30 may be formed of the same metal.

The droplet-based energy harvester 1 according to the embodiment may include the connection line 43 configured to connect the lower electrode 30 to one of the first upper electrode 21 and the second upper electrode 22, a first lead-out line configured to be connected to the lower electrode 30 and the first upper electrode 21 or the second upper electrode 22 interconnected by the connection line 43, to lead out current, and a second lead-out line 42 connected to the second upper electrode 22 or the first upper electrode 21 not connected by the connection line 43.

The connection line 43 is a line configured to interconnect the lower electrode 30 and the second upper electrode 22 or the first upper electrode 21. The connection line 43 may be formed of an electrically conductive material and, as such, may enable the electrode connected thereto to have the same electrical potential as that thereof. The connection line 43 may interconnect the lower electrode 30 and the second upper electrode 22. Alternatively, the connection line 43 may interconnect the lower electrode 30 and the first upper electrode 21. The connection line 43 may be implemented as an electrode pattern printed on the plate 10. The connection line 43 may be implemented as a structure configured to interconnect the lower electrode 30 and one of the upper electrodes 20 through a through hole formed at the plate 10 in a procedure of forming the lower electrode 30 or the upper electrodes 20.

The first lead-out line 41 and the second lead-out line 42 may be connected to the harvesting circuit 120 and, as such, may transmit current output from the droplet-based energy harvester 1. The first lead-out line 41 may be connected to one of the electrodes (the upper electrode and the lower electrode) connected to the connection line 43. For example, when the lower electrode 30 and the second upper electrode 22 are interconnected by the connection line 43, the first connection line 41 may be connected to the lower electrode 30 or the second upper electrode 22. On the other hand, when the lower electrode 30 and the first upper electrode 21 are interconnected by the connection line 43, the first connection line 41 may be connected to the lower electrode 30 or the first upper electrode 21. For example, in FIGS. 2 and 3, the connection line 43 is shown as interconnecting the lower electrode 30 and the second upper electrode 22, the first lead-out line 41 is shown as being connected to the second upper electrode 22, and the second lead-out line 42 is shown as being connected to the first upper electrode 21.

Figure 4:
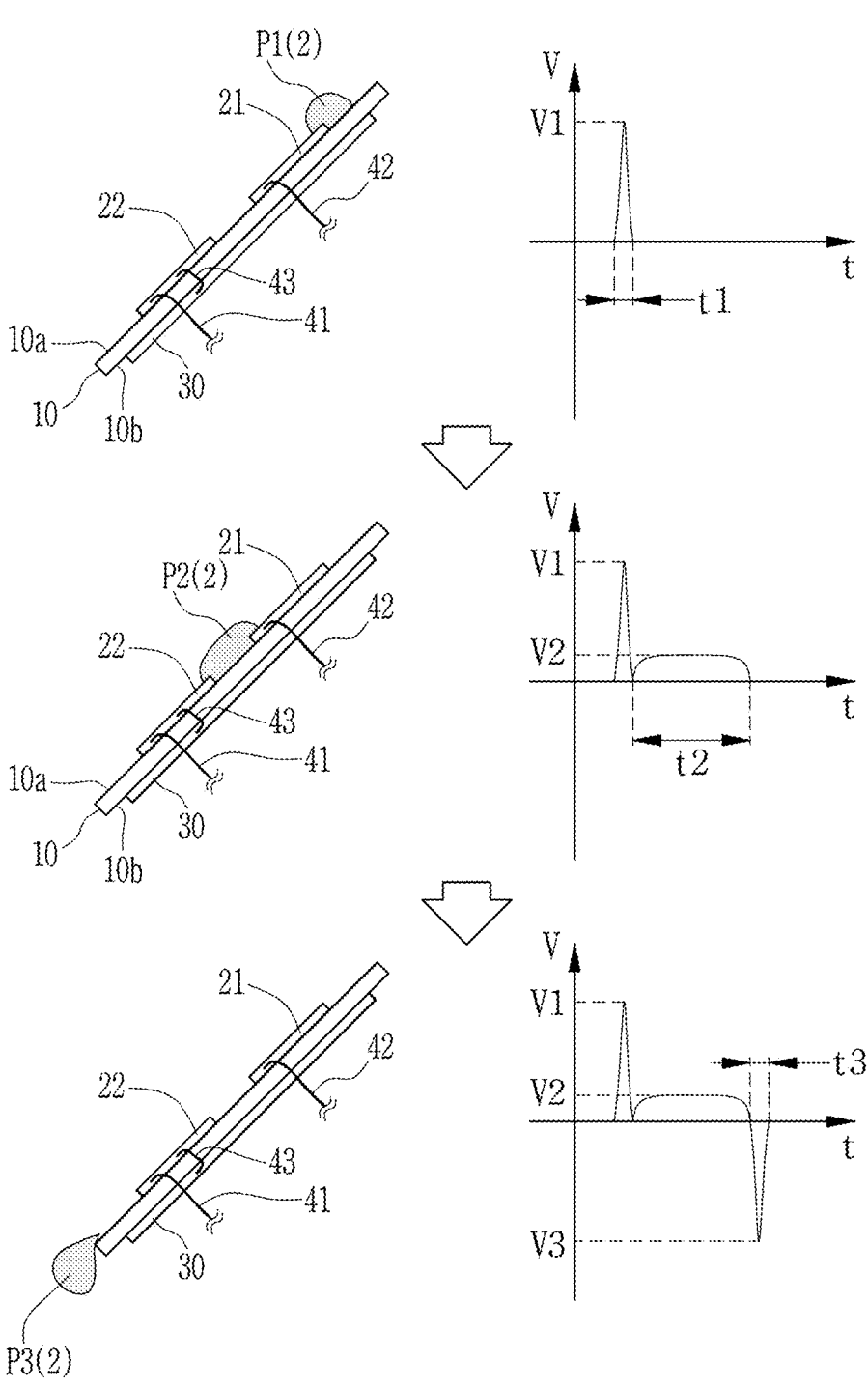
FIG. 4 is a diagram depicting a waveform of a voltage output from the droplet-based energy harvester of the embodiment in accordance with a position of the droplet.

FIG. 4 is a diagram depicting a waveform of a voltage output from the droplet-based energy harvester 1 of the embodiment in accordance with a position of the droplet 2. FIG. 4 sequentially shows a state P1 in which the droplet 2 contacts the first upper electrode 21 of the upper electrode 20, a state P2 in which the droplet 2 contacts both the first upper electrode 21 and the second upper electrode 22, and a state P3 in which the droplet 2 is separated from the second upper electrode 22 after contacting the second upper electrode 22, and depicts waveforms generated in accordance with respective states. The droplet 2 flows in an order of P1, P2, and P3.

In the state P1 in which the droplet 2 contacts the first upper electrode 21 of the upper electrode 20, current flowing through the first lead-out line 41 and the second lead-out line 42 takes the form of a peak in which a voltage V1 thereof is great in magnitude, and a duration time t1 thereof is short. In this case, the current may be generated in accordance with a triboelectrification or polarization phenomenon among the droplet 2, the plate 10, the anode, and the lower electrode 30. The generated current may be transmitted to the harvesting circuit 120, and may then be stored in the battery 130 after being rectified.

In the state P2 in which the droplet 2 contacts both the first upper electrode 21 and the second upper electrode 22, current flowing through the first lead-out line 41 and the second lead-out line 42 takes the form of DC in which a voltage V2 thereof is relatively small in magnitude, but a duration time t2 thereof is long. Here, "relatively small voltage magnitude" means that the voltage of the current generated when the droplet 2 is disposed at the position P2 is smaller in magnitude than the voltage of the current generated when the droplet 2 is disposed at the position P1 or the position P3. Current may be generated by charges moving through the droplet 2 between the first upper electrode 21 and the second upper electrode 22. Electrons are emitted from the first upper electrode 21, whereas reduction of the electrons occurs at the second upper electrode 22, and, as such, current may be generated as in a primary cell structure. The generated current may be transmitted to the harvesting circuit 120, and may then be stored in the battery 130.

In the state P3 in which the droplet 2 is separated from the second upper electrode 22 after contacting the second upper electrode 22, current flowing through the first lead-out line 41 and the second lead-out line 42 takes the form of a peak in which a voltage V3 thereof is great in magnitude, and a duration time t3 thereof is short. In this case, the current is output in a direction reverse to the direction of current generated in the state P1 in which the droplet 2 contacts the first upper electrode 21. The current may be generated as the triboelectrification or polarization phenomenon among the droplet 2, the plate 10, the cathode, and the lower electrode 30 is released. The generated current may be transmitted to the harvesting circuit 120, and may then be stored in the battery 130 after being rectified.

AC is generated at a moment when the droplet 2 initially contacts one upper electrode 20 after falling onto the plate 10, that is, in the state P1, and a moment when the droplet 2 flows outwards after being separated from another upper electrode 20, that is, in the state P3. On the other hand, DC is generated when the droplet 2 interconnects the upper electrodes 20, that is, in the state P2 in which the droplet 2 interconnects the second upper electrode 22 and the first upper electrode 21. The AC generated by the droplet 2 provides small electrical energy because, although the voltage thereof is relatively high, the duration thereof is short, whereas the DC generated for a time in which the droplet 2 interconnects the first upper electrode 21 and the second upper electrode 22 provides relatively great electrical energy because, although the voltage thereof is relatively low, the duration thereof is long. The droplet-based energy harvester 1 according to the embodiment may generate and store both the AC and the DC and, as such, may harvest a great amount of energy.

Figure 5:
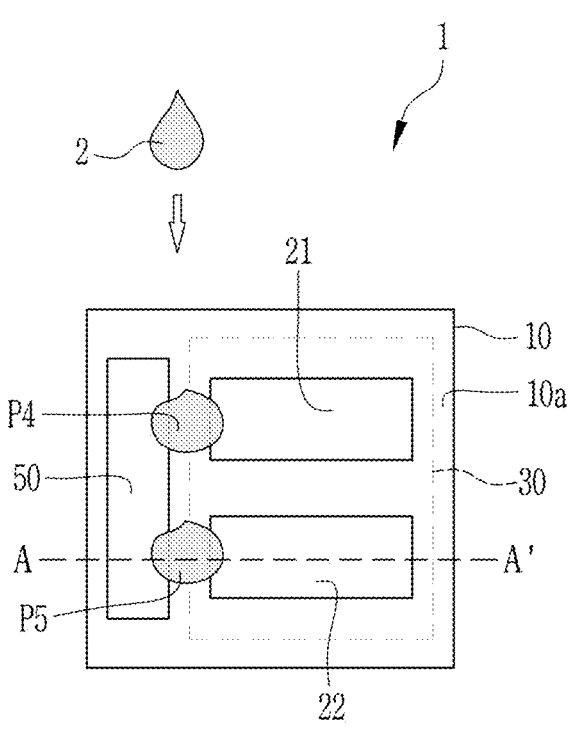
FIG. 5 is a view showing the droplet-based energy harvester including a sacrificial electrode according to an embodiment.
Figure 6:
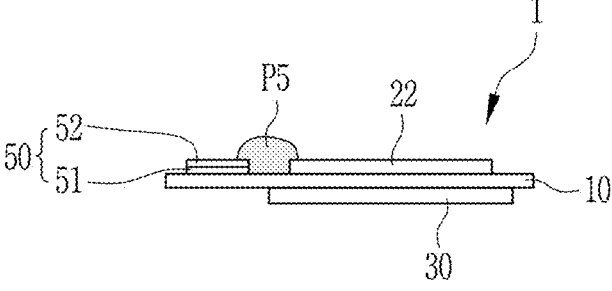
FIG. 6 is a cross-sectional view taken along line A-A' in FIG. 5.

FIG. 5 is a view showing the droplet-based energy harvester 1 including a sacrificial electrode 50 according to an embodiment. FIG. 6 is a cross-sectional view taken along line A-A' in FIG. 5.

The droplet-based energy harvester 1 may further include the sacrificial electrode 50 which is disposed to be spaced apart from the first upper electrode 21 and the second upper electrode 22. The sacrificial electrode 50 may be formed to be spaced apart from the first upper electrode 21 and the second upper electrode 22 in a direction perpendicular to the flow direction of the droplet 2. The sacrificial electrode 50 may be formed to have a length corresponding to a length from the first upper electrode 21 to the second electrode 22.

The sacrificial electrode 50 may be formed of a metal having lower electronegativity than those of the first upper electrode 21 and the second upper electrode 22. That is, among the metal forming the sacrificial electrode 50, the metal forming the first upper electrode 21, and the metal forming the second upper electrode 22, the metal having lowest electronegativity is the metal forming the sacrificial electrode 50. For example, when the first upper electrode 21 is formed of aluminum (Al), and the second upper electrode 22 is formed of copper (Cu), the sacrificial electrode 50 may be formed of magnesium (Mg), an alloy including the same, or the like.

Since the sacrificial electrode 50 is made of a low-potential metal, the sacrificial electrode 50 may prevent corrosion of the first upper electrode 21 or the second upper electrode 22 when the sacrificial electrode 50 is connected to the first upper electrode 21 or the second upper electrode 22 by the droplet 2. When current flows between the first upper electrode 21 and the second upper electrode 22 in a state in which the droplet 2 contacts both the first upper electrode 21 and the second upper electrode 22, the first upper electrode 21 and the second upper electrode 22 may be corroded. When the droplet 2 interconnects the corroded electrode and the sacrificial electrode 50, the sacrificial electrode 50 provides an anti-corrosion potential to the corroded electrode, thereby preventing corrosion. When the droplet 2 is disposed between the first upper electrode 21 and the sacrificial electrode 50 (P4), the sacrificial electrode 50 may prevent corrosion of the first upper electrode 21. When the droplet 2 is disposed between the second upper electrode 22 and the sacrificial electrode 50 (P5), the sacrificial electrode 50 may prevent corrosion of the second upper electrode 22.

The sacrificial electrode 50 may be detachably coupled to the plate 10. This is because it is necessary to replace the sacrificial electrode 50 with a new one when the sacrificial electrode 50 is completely consumed. The sacrificial electrode 50 may include a detachable portion 51 detachably fixed to the plate 10, and a sacrificial metal 52 formed at the detachable portion 51. The detachable portion 51 may be coupled to and separated from the plate 10 in various manners. For example, the detachable portion 51 may be fitted in a groove formed at the plate 10 in a sliding manner. The detachable portion 51 may be an adhesive film and, as such, may be bonded to the plate 10. The sacrificial metal 52 may be formed on the detachable portion 51. When the detachable portion 51 is separated from the plate 10, the sacrificial metal 52 may also be separated from the plate 10.

Figure 7:
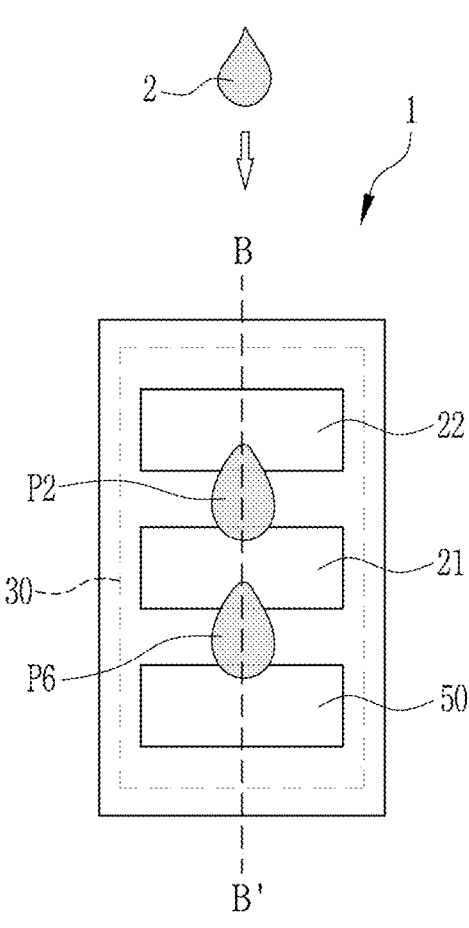
FIG. 7 is a view showing the droplet-based energy harvester including a sacrificial electrode according to an embodiment.
Figure 8:
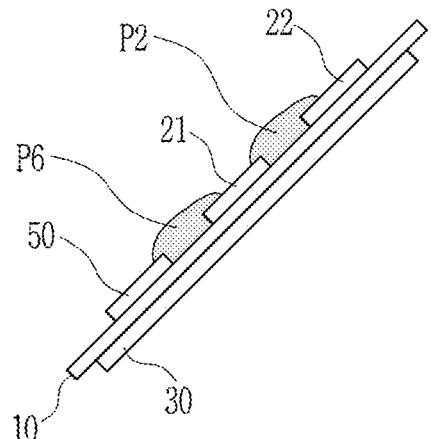
FIG. 8 is a cross-sectional view taken along line B-B' in FIG. 7.

FIG. 7 is a view showing the droplet-based energy harvester 1 including a sacrificial electrode 50 according to an embodiment. FIG. 8 is a cross-sectional view taken along line B-B' in FIG. 7.

The second upper electrode 22, the first upper electrode 21, and the sacrificial electrode 50 may be sequentially disposed in a direction in which the droplet 2 flows on the first surface 10a. In this case, the electrode disposed near the sacrificial electrode 50 may be the first upper electrode 21. Current flows at a position P2 where the droplet 2 interconnects the second upper electrode 22 and the first upper electrode 21, and the droplet 2 then moves to a position P6 where the droplet 2 interconnects the first upper electrode 21 and the sacrificial electrode 50 and, as such, the sacrificial electrode 50 may prevent a corrosion of the first upper electrode 21. The sacrificial electrode 50 may be formed to have the same size as that of the first upper electrode 21, and may be spaced apart from the first upper electrode 21 by a distance equal to a distance between the first upper electrode 21 and the second upper electrode 22. The size of the sacrificial electrode 50 may be determined in accordance with an amount thereof consumed while preventing a corrosion of the first upper electrode 21.

Figure 9:
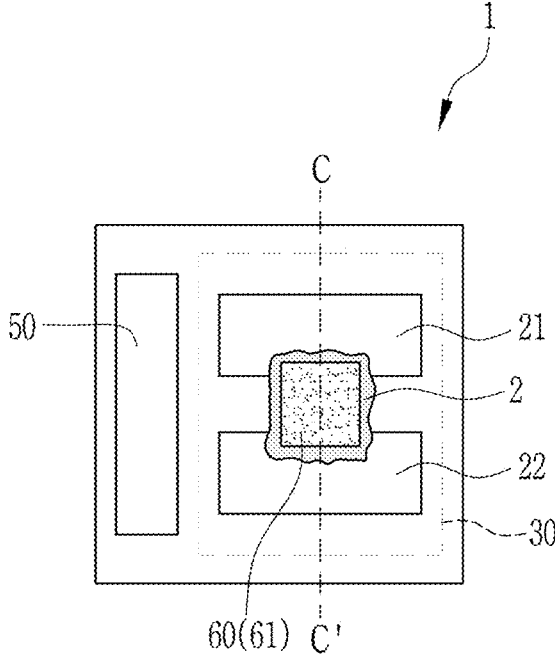
FIG. 9 is a view showing the droplet-based energy harvester including a holder according to an embodiment.
Figure 10:
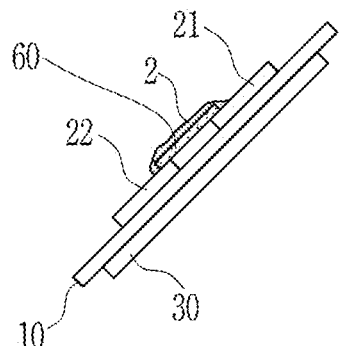
FIG. 10 is a cross-sectional view taken along line C-C' in FIG. 9.

FIG. 9 is a view showing the droplet-based energy harvester 1 including a holder 60 according to an embodiment. FIG. 10 is a cross-sectional view taken along line C-C' in FIG. 9.

The droplet-based energy harvester 1 may further include a holder 60 disposed between the first upper electrode 21 and the second upper electrode 22 and configured to hold the droplet 2 in order to enable the droplet 2 to interconnect the first upper electrode 21 and the second upper electrode 22. The holder 60 may increase the time for which the droplet 2 interconnects the first upper electrode 21 and the second upper electrode 22. As the time for which the droplet 2 interconnects the first upper electrode 21 and the second upper electrode 22 increases, the time for which DC generated in the state P2 in FIG. 4 is output is increased and, as such, an amount of harvested electrical energy may be increased.

The holder 60 may be a porous member 61 disposed between the first upper electrode 21 and the second upper electrode 22 to absorb the droplet 2. For example, the porous member 61 may be a sponge. The porous member 61 may be formed to contact the first upper electrode 21 at one end thereof while contacting the second upper electrode 22 at the other end thereof. When the droplet 2 is absorbed in the porous member 61 while being brought into contact with the porous member 61 during flow thereof on the first surface 10a, the droplet 2 absorbed in the porous member 61 may continuously interconnect the first upper electrode 21 and the second upper electrode 22. In this state, DC may be continuously output through the first lead-out line 41 and the second lead-out line 42.

Figure 11:
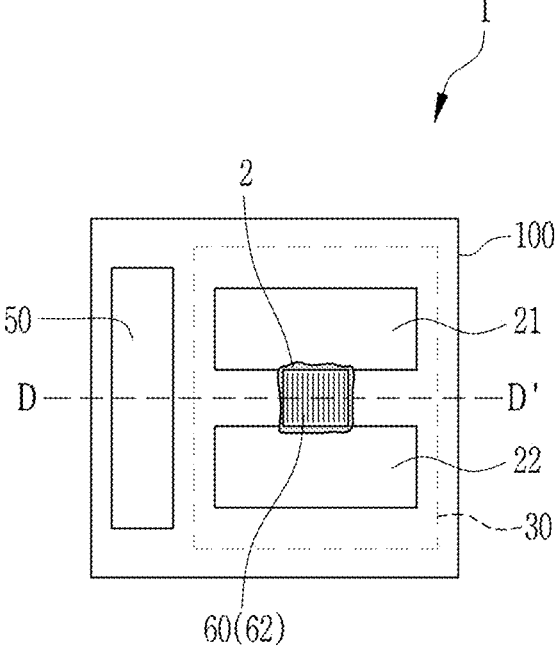
FIG. 11 is a view showing the droplet-based energy harvester including a holder according to an embodiment.
Figure 12:
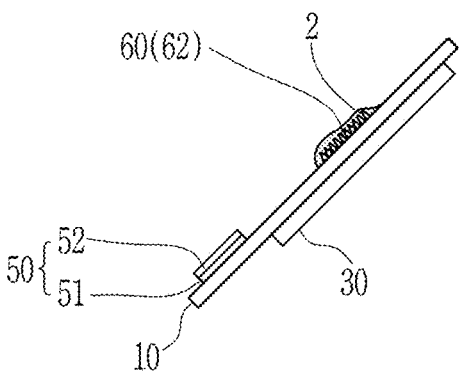
FIG. 12 is a cross-sectional view taken along line D-D' in FIG. 11.

FIG. 11 is a view showing the droplet-based energy harvester 1 including a holder 60 according to an embodiment. FIG. 12 is a cross-sectional view taken along line D-D' in FIG. 11.

The holder 60 may be a hydrophilic path 62 formed between the first upper electrode 21 and the second upper electrode 22. The hydrophilic path 62 may be printed on the plate 10. The hydrophilic path 62 may be formed through coating of a hydrophilic material on the plate 10. The hydrophilic path 62 may be connected to the first upper electrode 21 at one end thereof while being connected to the second upper electrode 22 at the other end thereof. The hydrophilic path 62 is formed of an electrically insulating material and, as such, prevents transmission of current therethrough. The hydrophilic path 62 may hold the droplet 62 for a lengthened time when the droplet 62 interconnects the first upper electrode 21 and the second upper electrode 22. The hydrophilic path 62 may take the form of a plurality of long lines spaced apart from one another in order to generate a capillary phenomenon. The thickness and spacing of the lines may be determined in accordance with a property (viscosity, temperature, etc.) of the droplet 2 or an inclination of the plate 10. When the droplet 2 contacts the hydrophilic path 62, the droplet 2 may be filled among the lines in accordance with a capillary phenomenon, thereby interconnecting the first upper electrode 21 and the second upper electrode 22.

Figure 13:
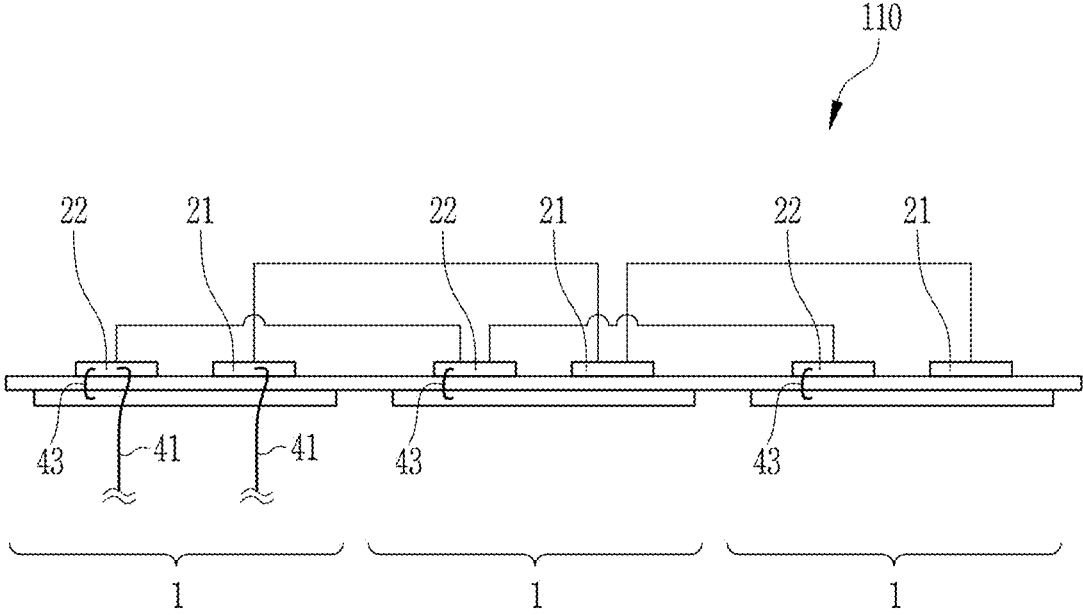
FIGS. 13 and 14 are views each showing connection of a plurality of droplet-based harvesters according to an embodiment.
Figure 14:
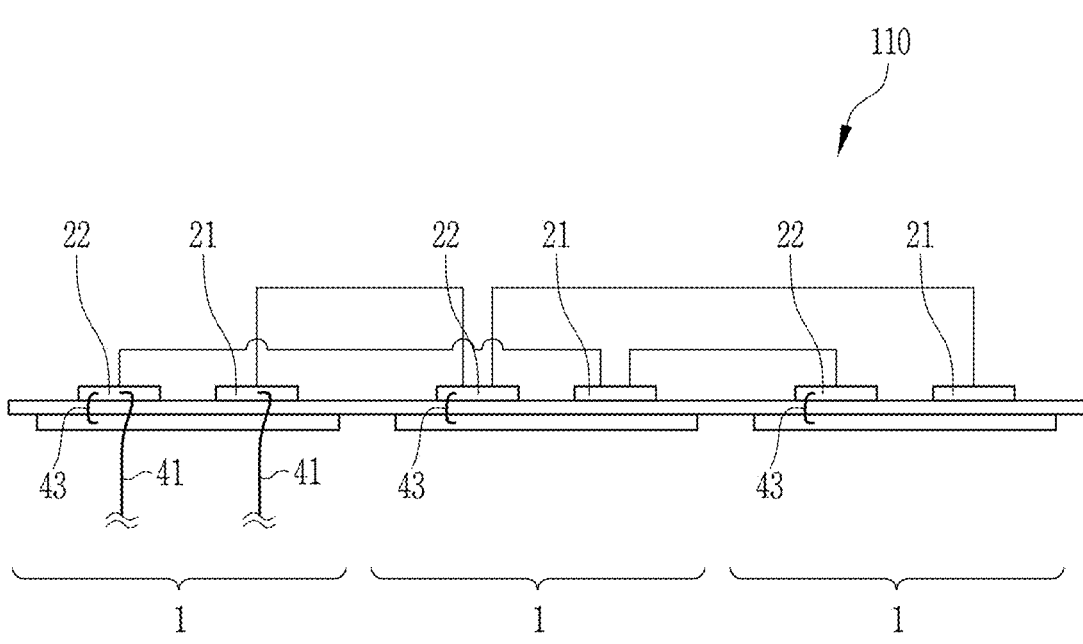

FIGS. 13 and 14 are views each showing connection of a plurality of droplet-based harvesters 1 according to an embodiment.

As shown in FIG. 13, in an energy harvesting module 110 according to an embodiment, a plurality of energy harvesters 1 may be disposed, lower electrodes 30 of the energy harvesters 1 may be spaced apart from one another, first upper electrodes 21 of the energy harvesters 1 may be connected in parallel, and second upper electrodes 22 of the energy harvesters 1 may be connected in parallel.

In the energy harvesting module 110, the upper electrodes 20 and the lower electrodes 30 are disposed in plural arrays on one plate 10 and, as such, a plurality of droplet-based energy harvesters 1 may be formed. In this case, when all first lead-out lines 41 and all second lead-out lines 42 of the droplet-based energy harvesters 1 are connected to a harvesting circuit, the resultant circuit may be complicated. To this end, the plurality of droplet-based energy harvesters 1 is connected to one another and, as such, current may be output through a pair of lead-out lines 41 and 42. The first upper electrodes 21 of adjacent ones of the droplet-based energy harvesters 1 may be interconnected, and the second upper electrodes of the adjacent droplet-based energy harvesters 1 may be interconnected. Thereafter, the first lead-out line 41 may be connected to one of the first upper electrodes 21, and the second lead-out line 42 may be connected to one of the second upper electrodes 22. Accordingly, the plurality of droplet-based energy harvesters 1 has a parallel connection structure on the whole.

As shown in FIG. 14, in an energy harvesting module 110 according to an embodiment, a plurality of energy harvesters 1 may be disposed, lower electrodes 30 of the energy harvesters 1 may be spaced apart from one another, and a first upper electrode 21 of one of adjacent ones of the energy harvesters 1 and a second upper electrode 22 of the other of the adjacent energy harvesters 1 may be connected in series.

In order to connect a plurality of droplet-based energy harvesters 1 in series, the first upper electrode 21 of one droplet-based energy harvester 1 and the second upper electrode 22 of another droplet-based energy harvester 1 may be interconnected, the second upper electrode 22 of the one droplet-based energy harvester 1 and the first upper electrode 21 of the other droplet-based energy harvester 1 may be interconnected, and this connection may be repeated for all droplet-based energy harvesters 1. The droplet-based energy harvesters 1 connected in series on the whole may charge a battery 130 with an increased voltage because the voltage of DC generated in the state P2 of FIG. 4 is relatively increased.

A plurality of droplet-based energy harvesters 1 may be connected to have a serial and parallel connection structure as the parallel connection structure described with reference to FIG. 13 and the serial connection structure described with reference to FIG. 14 are interconnected.

When the energy harvesting module 110 including the plurality of droplet-based energy harvesters 1 according to each embodiment as described above is used, it may be possible to generate electrical energy from the droplet 2 and to store the electrical energy in the battery 130 through a harvesting circuit 120.

In accordance with the present disclosure, it may be possible to harvest both AC and DC using the droplet-based energy harvester.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

Simple modifications and alterations fall within the scope of the disclosure, and the protection scope of the disclosure will be apparent from the appended claims.

What is claimed is:

1. A droplet-based energy harvester comprising:
a plate comprising a first surface and a second surface opposite to the first surface, the plate being inclined such that a droplet flows on the first surface;
an upper electrode formed on the first surface; and
a lower electrode formed on the second surface,
the upper electrode comprising:
a first upper electrode configured to emit electrons in response to the first upper electrode being connected to a second upper electrode by the droplet; and
the second upper electrode configured to absorb the electrons in response to the second upper electrode being connected to the first upper electrode by the droplet.

2. The droplet-based energy harvester according to claim 1, further comprising:

a connection line configured to connect the lower electrode to one of the first upper electrode or the second upper electrode;
a first lead-out line connected to the lower electrode and the first upper electrode or the second upper electrode interconnected by the connection line, thereby leading out current; and
a second lead-out line connected to the second upper electrode or the first upper electrode not connected by the connection line, thereby leading out current.

3. The droplet-based energy harvester according to claim 1, wherein the first upper electrode and the second upper electrode are sequentially arranged in a direction in which the droplet flows on the first surface.

4. The droplet-based energy harvester according to claim 3, further comprising:
a sacrificial electrode disposed to be spaced apart from the first upper electrode and the second upper electrode.

5. The droplet-based energy harvester according to claim 4, wherein the sacrificial electrode comprises:
a detachable portion detachably fixed to the plate; and
a sacrificial metal formed at the detachable portion.

6. The droplet-based energy harvester according to claim 1, further comprising:
a holder disposed between the first upper electrode and the second upper electrode and configured to hold the droplet in order to enable the droplet to interconnect the first upper electrode and the second upper electrode.

7. The droplet-based energy harvester according to claim 6, wherein the holder comprises a porous member disposed between the first upper electrode and the second upper electrode to absorb the droplet or a hydrophilic path formed between the first upper electrode and the second upper electrode.

8. The droplet-based energy harvester according to claim 1, wherein the first upper electrode and the second upper electrode comprise different metals having different values of electronegativity, respectively.

9. The droplet-based energy harvester according to claim 4, wherein the sacrificial electrode comprises a metal having a lower electronegativity value than electronegativity values of the first upper electrode and the second upper electrode.

10. The droplet-based energy harvester according to claim 1, wherein:
the plate comprises a dielectric material; and
the lower electrode is longer than the upper electrode in a flow direction of the droplet.

11. An energy harvesting apparatus comprising:
an energy harvesting module comprising a plurality of droplet-based energy harvesters;
a battery configured to store electrical energy output from the energy harvesting module; and
a harvesting circuit configured to receive AC or DC output from the energy harvesting module and to store the received AC or DC in the battery,
each of the plurality of droplet-based energy harvesters comprising:
a plate comprising a first surface and a second surface opposite to the first surface, the plate being inclined such that a droplet flows on the first surface;
an upper electrode formed on the first surface; and
a lower electrode formed on the second surface,
the upper electrode comprising:
a first upper electrode configured to emit electrons in response to the first upper electrode being connected to a second upper electrode by the droplet; and the second upper electrode configured to absorb the electrons in response to the second upper electrode being connected to the first upper electrode by the droplet.

12. The energy harvesting apparatus according to claim 11, wherein lower electrodes of the plurality of droplet-based energy harvesters are formed to be spaced apart from one another, wherein first upper electrodes of the plurality of droplet-based energy harvesters are interconnected in parallel, and wherein second upper electrodes of the plurality of droplet-based energy harvesters are interconnected in parallel.

13. The energy harvesting apparatus according to claim 11, wherein lower electrodes of the plurality of droplet-based energy harvesters are formed to be spaced apart from one another, and wherein a first upper electrode of one of adjacent ones of the plurality of droplet-based energy harvesters and a second upper electrode of the other of the adjacent energy harvesters are interconnected in series.

\* \* \* \* \*